A. L. JOHNSON.
AIR BAG FOR TIRE REPAIRING.
APPLICATION FILED FEB. 21, 1916.

1,319,088. Patented Oct. 21, 1919.

Inventor
Alvin L. Johnson
By Attorneys
Southgate & Southgate

UNITED STATES PATENT OFFICE.

ALVIN L. JOHNSON, OF WORCESTER, MASSACHUSETTS.

AIR-BAG FOR TIRE-REPAIRING.

1,319,088.  Specification of Letters Patent.  Patented Oct. 21, 1919.

Application filed February 21, 1916. Serial No. 79,606.

*To all whom it may concern:*

Be it known that I, ALVIN L. JOHNSON, a citizen of the United States, residing at Worcester, in the county of Worcester and State of Massachusetts, have invented a new and useful Air-Bag for Tire-Repairing, of which the following is a specification.

This invention relates to an air bag or core for use in repairing tires.

The principal objects of the invention are to provide a single tube core, or air bag, for this purpose which under all conditions of use will be capable of being expanded by the pressure within, so as to exert a maximum pressure on the tire that is being repaired; to provide a construction in which only one tube has to be used and that will be not only more flexible but more durable than has been the case heretofore; to provide means for limiting the position of the air bag inwardly and shaping the inside surfaces of the toes of the bead; to provide a construction in which the blowing out of the ends of the tube is effectively prevented and one which will be inexpensive to make and especially inexpensive to keep in repair.

Reference is to be had to the accompanying drawings in which—

Figure 1:
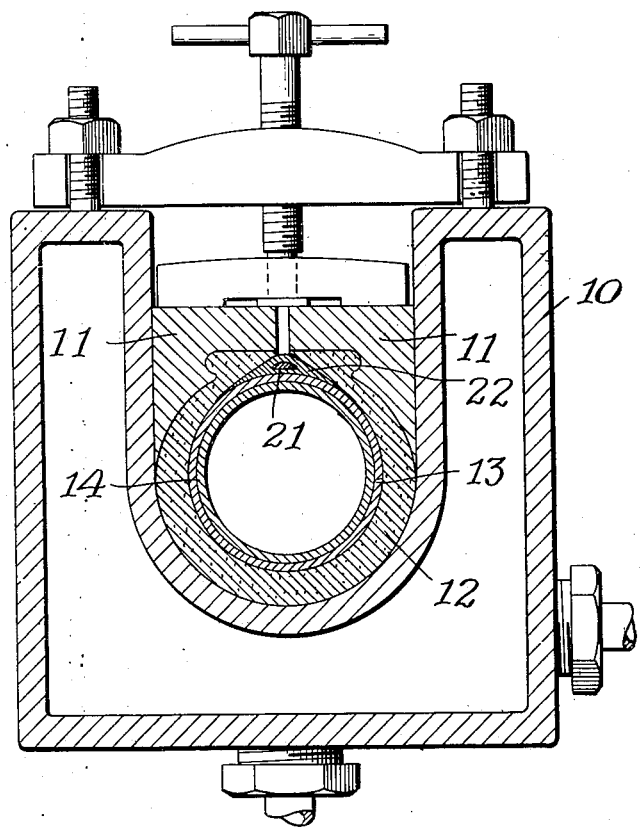
Figure 1 is a cross section of an automobile tire repairing vulcanizing mold with a preferred embodiment of this invention shown therein.

The usual form of air bag for use in repairing automobile tires consists of a single tube composed of several layers of frictioned duck and with a comparatively thick layer of rubber inside the same to hold the air pressure. On account of the shape of the mold the surface of the bag on its concave side has a tendency to depart from the circular form and project up between the clamps to form an acute angle. It has been found in practice that this produces cracks on the inside of this angle through the rubber layer and very greatly reduces the life of the bag on account of leakage. Furthermore the bag becomes stiff after short usage so that although it sustains the pressure of sixty pounds inside, this pressure is expended against the almost solid walls of the bag and is not transmitted in full to the tire which is being vulcanized. Furthermore, the ends of these bags frequently blow out and as a matter of fact the life then, is very uncertain. Sometimes they will stand only two or three operations, and sometimes a much larger number. This invention is designed mainly for curing these several defects and producing an inexpensive bag which will not be subject to these disadvantages.

Referring to the drawings in detail it will be observed that an ordinary type of vulcanizing mold 10 is shown having the clamps 11. The tire 12 is shown in the mold being vulcanized for repairing purposes. This invention relates to the core or air bag which is placed inside the tire and which is constructed in a very simple manner. This core 13 consists of a closed bag of the proper shape made up preferably of a single layer of frictioned duck or other rubberized textile material. This is woven diagonally, or at least the cloth is made up to form the bag in such a manner that the threads will have a diagonal direction. This is done in order to permit expansion. With this construction only a comparatively thin layer 14 of pure rubber inside the textile layer is required. The ends of the bag are made with metal disks 15 embedded in the rubber and one of them is perforated to allow the air inlet tube 16 to pass through it. Both of them have screw-threaded studs 18 on the outside to receive winged nuts 17. This provides a firm anchorage for the tube. The core 13 is circular in cross section.

In addition to the tube itself a holder is provided. This consists of two centrally perforated cup-shaped caps 20 of metal, each shaped and adapted to enter the tire and fit it and also shaped inside to receive the cylindrical end of the core. Each of them is provided with a perforation to permit the passage of the studs 18. These two ends are secured together by a half round steel rod 21 which is curved to conform to the curvature of the tire and is covered on both sides with frictioned cloth 22, preferably with a layer of rubber inside the same to contact with the surface of the core.

Figure 2:
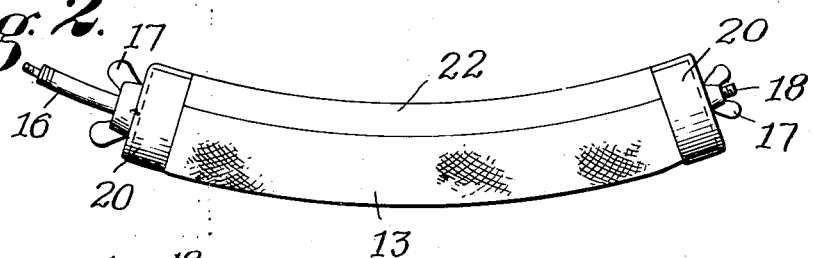
Fig. 2 is a side view of the air bag and its supporting element.
Figure 3:
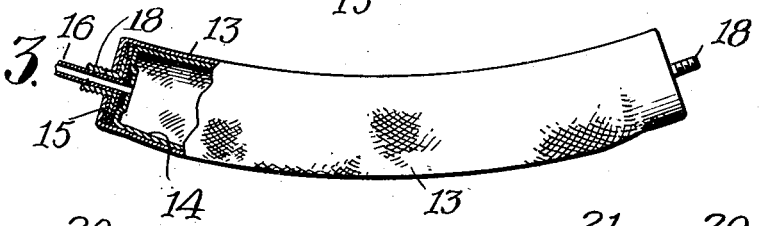
Fig. 3 is a similar view of the air bag alone with parts thereof shown in section.
Figure 4:
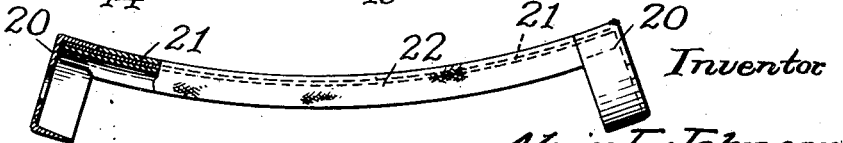
Fig. 4 is a similar view of the supporting device for the bag, partly in section.

In the use of the device the core is placed in the holder as indicated in Fig. 2 and these parts are thereafter handled as a single one and introduced into the tire in the usual way before that is put into the mold. The vulcanizing operation of course is not modified by the use of this bag. But the entire benefit of the sixty pounds or other pressure introduced into the bag is secured for action on the inner surface of the tire which is being operated upon. This is an important point because a good job cannot be done unless the rubber of the tire is kept under a high degree of pressure during the vulcanizing process. This is possible with this device for the reason that on account of the holding means a comparatively thin and flexible tube or core can be employed without danger of the same stretching or blowing out. The members 20 are located between the clamps and of course they are firmly held in position within the tire and mold.

The members 21 and 22 prevent the air bag taking on an angular form between the two mold clamps and thus do away with the crease usually produced inside and the cracking as heretofore mentioned. Furthermore there is no chance of buckling of the outer case. It also limits the position of the surface of the air bag inwardly and shapes the insides of the toes of the bead.

The device is much more durable than the more complicated and expensive bag ordinarily used and it is an important advantage that the holding means is practically indestructible by ordinary usage as there are no parts that are likely to get out of order. Consequently after a set is once purchased the renewals are merely due to the eventual breaking down of the material of the tube and this tube is very inexpensive and can be replaced readily without replacement of the holding means. Furthermore, by this arrangement the advantages of the double tube type of cores are secured without the use of the outer tube and without the complications and disadvantages thereof. The supporting frame has no important rubber parts that have to be replaced or discarded, and repeated vulcanizations with this device do not materially affect the holding member.

Although I have illustrated and described only a single form of the invention I am aware of the fact that many modifications can be made therein by any person skilled in the art without departing from the scope of the invention as expressed in the claims. Therefore I do not wish to be limited to the exact form herein shown and described, but what I do claim is—

1. As an article of manufacture, a tube or core for tire repairing purposes comprising a flexible tube for holding the air pressure, and a separate external frame for engaging and holding its opposite ends and preventing them from stretching or blowing out.

2. As an article of manufacture, a tube or core for tire repairing purposes comprising a flexible closed bag for holding the air pressure and subjecting the inner surface of the tire being repaired to pressure, a pair of inflexible caps for holding the ends of said tube, and means outside said tube for connecting said caps together to prevent their motion independently of each other.

3. As an article of manufacture, a tube or core for tire repairing purposes comprising a flexible readily expansible tube having an outer layer of rubberized textile material made with its threads running diagonally in the surface thereof and adapted to transmit pressure directly to the inner surface of the tire to be vulcanized and having integral ends, and rigid means for holding the ends of said tube against motion in opposite directions.

4. As an article of manufacture, a tube or core for tire repairing purposes comprising an expansible air bag circular in cross section, and provided with circular ends, a pair of metallic caps for receiving and fitting the ends of said air bag and a metal rod located on the concave side for connecting said caps together, said rod being provided with a rubberized protecting coating and constituting means for limiting the position of the surface of the air bag inwardly.

5. As an article of manufacture a tube or core for tire repairing purposes comprising an expansible air bag, and a member located on the exterior surface of the concave side thereof for limiting the position of the surface of the air bag inwardly and having exterior surfaces flush and continuous with the exterior surface of the air bag for shaping the insides of the bead.

6. As an article of manufacture, an air bag or core for tire repairing purposes, consisting of flexible material and of complete circular shape in cross section, and having a curved member outside in contact throughout its area with its concave side to prevent its assuming an angular shape between the mold clamps during vulcanization.

7. The combination with a flexible curved air bag or core for tire repairing purposes, of a separate curved member having thin flexible edges located along the exterior surface of the concave side thereof for preventing creasing in the mold and shaping the insides of the toes of the bead.

In testimony whereof I have hereunto set my hand.

ALVIN L. JOHNSON.